Aug. 4, 1970  J. R. McCONNELL  3,522,408
APPARATUS FOR WELDING CONNECTION ANGLES TO STRUCTURAL BEAMS
Filed June 17, 1966  2 Sheets-Sheet 1
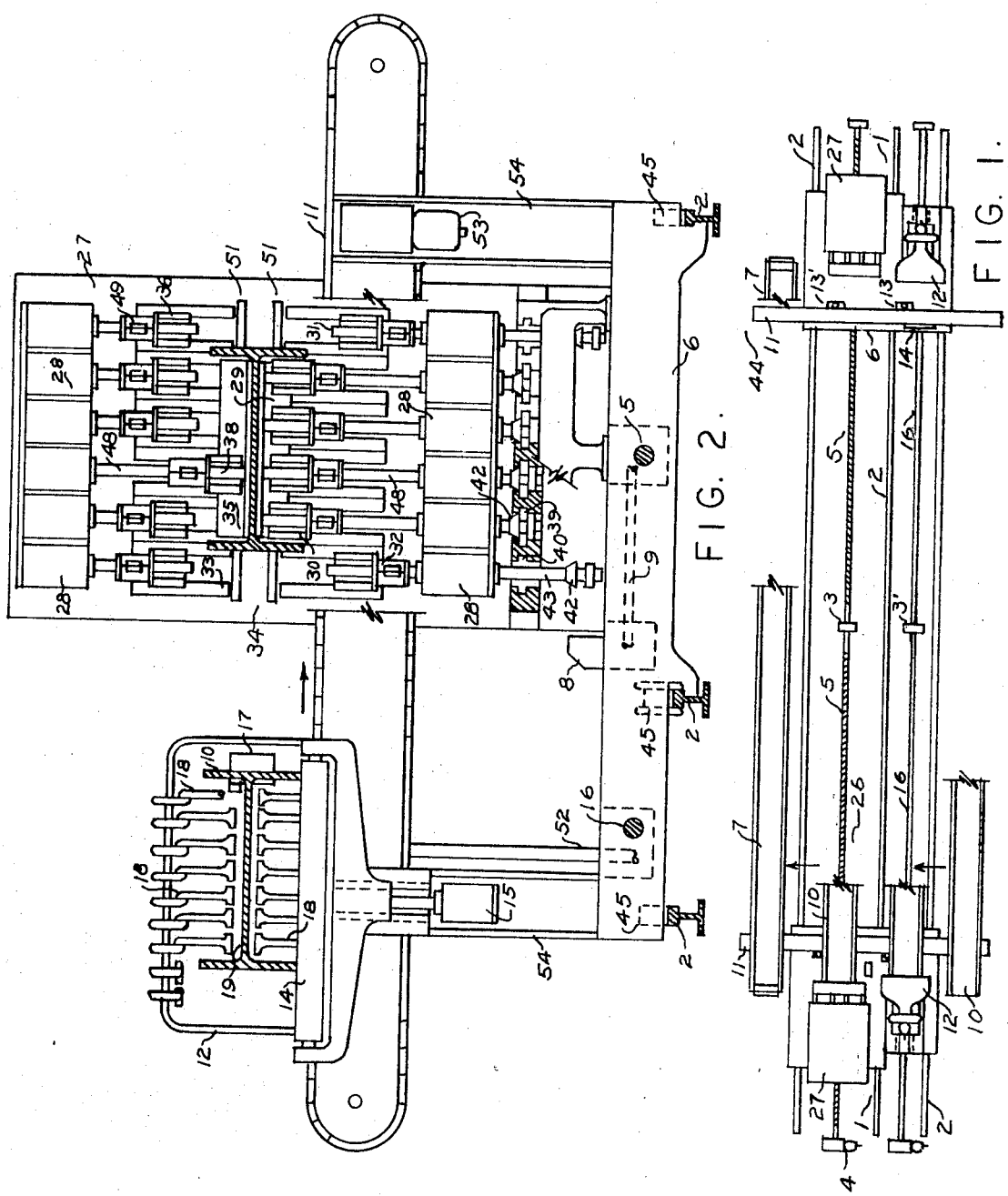
INVENTOR.
John R. McConnell Aug. 4, 1970   J. R. McCONNELL   3,522,408
APPARATUS FOR WELDING CONNECTION ANGLES TO STRUCTURAL BEAMS
Filed June 17, 1966   2 Sheets-Sheet 2

INVENTOR.
John R. McConnell

United States Patent Office 3,522,408
Patented Aug. 4, 1970

3,522,408
APPARATUS FOR WELDING CONNECTION ANGLES TO STRUCTURAL BEAMS
John R. McConnell, 148 Woodside Ave., Ridgewood, N.J. 07450
Continuation-in-part of application Ser. No. 249,205, Jan. 3, 1963, now Patent No. 3,257,540. This application June 17, 1966, Ser. No. 558,301
Int. Cl. B23k 11/10
U.S. Cl. 219—87                                    6 Claims

ABSTRACT OF THE DISCLOSURE

Conveyor belts move a structural beam first to a flame cleaning station, and then to a welding station where it is centered and where end connection angles are resistance welded against opposite sides of the beam web at each end thereof.

---

This invention relates to an automatic welding apparatus for the fabrication of structural beams.

It is an object of the present invention to set forth a fully mechanized integrated apparatus and method for the automatic handling, positioning, measuring, laying out, localized scale removing, assembling and welding of beam members.

The primary objective is to provide an integrated co-acting apparatus and process that will furnish completely finished unitary end products ready for erection-assembly in a structure.

It is also an objective to provide a versatile flexible apparatus for the rapid economical movement of the material, with the fabrication performed in one continuing multi-pronged operation.

Another objective is to provide a mobile apparatus and system that will quickly process members of various lengths, depths, widths and weights, with only minor adjustments.

For other objects and a better understanding of the invention reference may be had to the following detailed description taken in conjunction with the accompanying drawing in which:

FIG. 1 is a plan layout of the combined transverse-feed cleaning and welding apparatus.

FIG. 2 is a front elevation of an end cleaning and welding unit.

Some of the principles, actions and methods, usually with certain variations and improvements, used in co-pending applications by the undersigned inventor, are used in this application. This application is considered a continuation-in-part of: Co-pending application Ser. No. 249,205 Structural Steel Fabrication Processes, filed Jan. 3, 1963, now Pat. No. 3,257,540.

Refer also to Ser. No. 357,207 Automatic Resistance Welding Machine, filed Apr. 3, 1964, now Pat. No. 3,341,683. Abandoned Ser. No. 357,206 Structural Steel Fabricating Machine filed Apr. 3, 1964. Ser. No. 357,580 Automatic Fusion Welder for Structural Steel Members, filed Apr. 6, 1964, now Pat. No. 3,401,254.

Refer also to patents issued to the undersigned:
Pat. No. 3,085,148 Welding Machine . . . Steel Members, issued Apr. 9, 1963.
Pat. No. 3,127,661 Fabricating of Structural Steel Members or Units, issued Apr. 7, 1964.
Pat. No. 3,128,366 Fabricating of Structural Steel Members or Units, issued Apr. 7, 1964.

The term "shapes" of the steel trade refers to long pieces of steel of limited cross-sectional area produced by hot rolling at the steel mills. In this application they are of H or I cross-sectional shape suitable for use as floor beams, although in general the term also includes channels, angles and T's which are used in special cases. They are ordered from the steel mills in particular lengths for each job, but because they are cut hot as they come from the forming rolls by travelling saws they are permitted to be ½″ short or long. With the shapes ordered one inch short of the overall length of the member the dual connection angles slightly overhang at each end of the shape to give a precise finished member length. The length-centering rams hereinafter set forth equalize the end overhangs to prevent welds from tearing out of the shape at either end due to insufficient end lapping of the connection angles.

Figure 4:
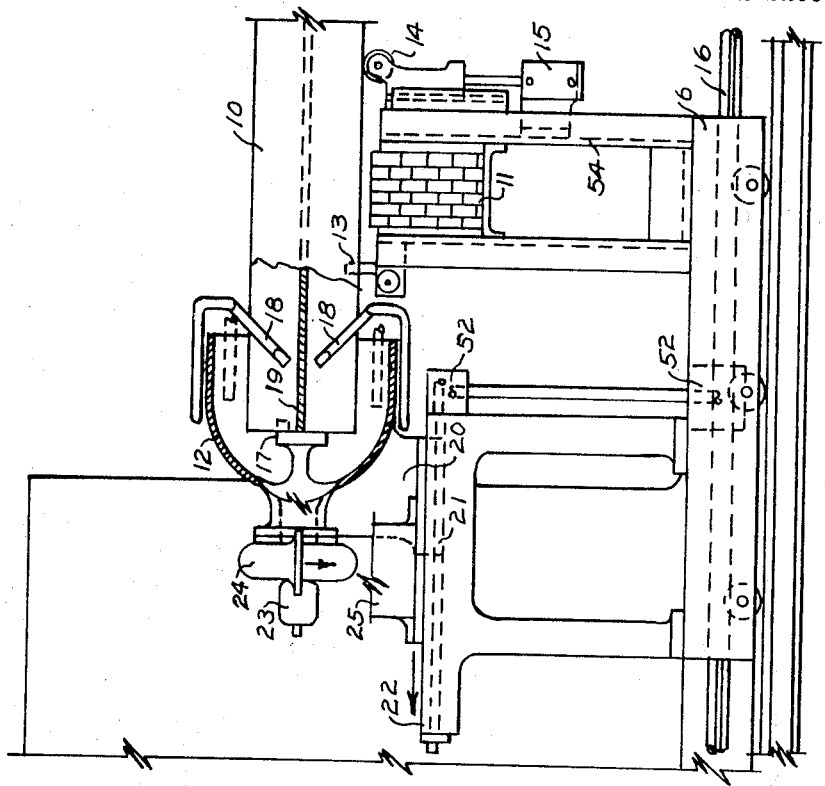
FIG. 4 is a side elevation, partly in section, of the length centerer and cleaner component of FIG. 1.
Figure 3:
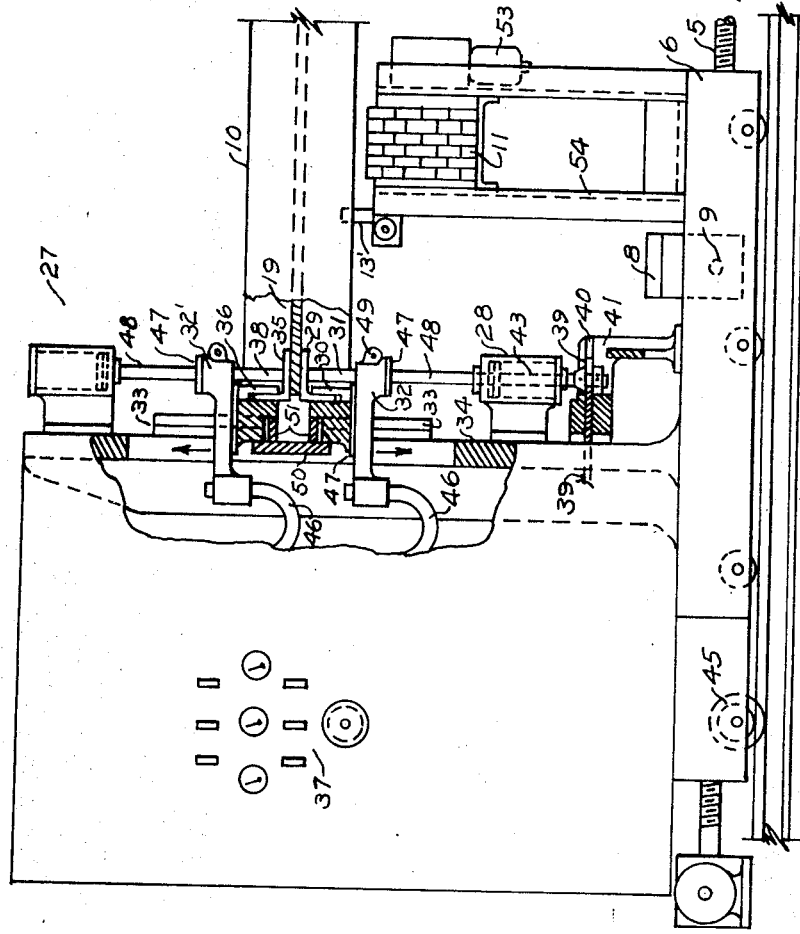
FIG. 3 is a side elevation, partly in section, of the welder component of FIG. 1.

Referring especially to FIG. 1; in the preferred embodiment of the invention one of the combined "conveyor 11-cleaner 12-welder 27 units" detailed in FIGS. 2, 3 and 4 is located on the supporting rails 2 to the left of the center shaft-anchorage 3. A dual conveyor-cleaner-welder is similarly located an equivalent distance to the right of the said anchorage 3. The working ends of these co-operating units 1 face inwardly to each other to simultaneously length-center, measure, and weld dual connection angles 29 and 35 simultaneously at each end of the raw shape producing a completely finished member of precise overall length in one continuing connected operation. These end fabricators 11–12–27 are symmetrically pre-located, to match the overall length of the member, from the centrally-located shaft anchorage 3 by the common, powered 4, threaded shaft 5 that is right-threaded through the common base 6 of the left fabricator and left-threaded through the common base 6 of the right fabricator. This symmetrical moving-spacing mechanism is an inversion of the familiar turnbuckle giving the important advantage of great linear adjustment limited only by the length of the common shaft. FIGS. 2, 3, and 4 show only the left hand fabricator 11–12–27. The co-operating right-hand welder is an opposite hand (dual) fabricating unit.

Initially the webs of the shapes near each end generally have to be cleaned of mill scale, rust, dirt and other foreign matter to permit a strong satisfactory weld. The independently-powered common keyed shaft 16 of the dual cleaner elements, through connected trains of gears move the length-centering and cleaning hoods at any location of the combined fabricators 1.

In brief the operation of the apparatus is: the dual end located resistance welders are pre-located a distance apart on a common track to produce a beam of the required length. The raw beam shape is placed on the dual conveyor belts and actuation of the belts moves it transversely forward to the dual flame cleaning units, where it is length centered between the end units and combustible gas and exhaust fans clean both sides of the beam web at the ends. The shape then moves to the welding units, where dual end connection angles are placed against opposite sides of the web at each end and are welded thereto by multiple, consecutively-executed, compound-chain, spot, resistance welds. The completed member is then conveyed forward to discharge.

In operation, the end combined conveyor cleaner-welders are symmetrically diverged from the central anchorage by the rotation of the oppositely threaded re-locating shaft to pre-locate the dual co-ordinated fabricator's operating centers a distance apart equal to the overall dimension required, measured over by the end connection angles of the member 7. Geared to the said shaft, a length measuring dial 8 continuously indicates the distance from the anchorage to the welders' operating centers, which is half the overall length. The raw shape 10 is then placed on the dual conveyor belts and actuation of the said belts moves the shape transversely to the dual stop-pins 13 that locate it abreast of the length-centering rams 17 built into the flame cleaning hoods 12. As the belt is stopped, a vertical piston raises the shape off the belts on freely revolvable rollers, for easy length centering by equal converging of the hoods by a continuously keyed shaft 16. With the flames ignited, the hoods are slowly diverged as the web scale is burned off the shape, to full retraction. Lowered to the belts, the shape is then forwarded to the welding area stop pins 13', when the required lower pistons, electrodes and connection angles elevate the shape to weld the dual connection angles to the web 19 by consecutive individual closure of the dual upper electrodes, to create plural compound-chain spot welds, simultaneously at both ends of the shape 10. Lowered to the conveyor belts, the completed member is forwarded to discharge as additional shapes move across the apparatus.

FIG. 1 shows a floor plan-layout of the complete apparatus comprising two co-operating spaced dual integrated two-stage simultaneous-acting mobile conveying cleaning and welding units 1 mounted on a common three rail 2 track. These opposite-hand end fabricating units 1 are symmetrically moved from a central reference and anchorage point 3, by a motorized 4 right and left threaded drive shaft 5 oppositely threaded through the bases 6 of the inwardly facing fabricating units 1 to suit the overall length of the finished member 7. The half length of the member is measured by a register 8 direct connected 9 to the relocating shaft 5. Refer also to FIG. 2.

A raw shape 10 placed on the dual transverse motorized 53 conveyor belts 11 is forwarded to be stopped on the line of the dual gas flame cleaning hoods 12 by transversely adjustable solenoid projectible stop pins 13. Freely revolving rollers 14, elevated by attached pistons in compressed air cylinders 15, raise the shape 10 off the conveyor belts 11, as rotation of the continuously keyed shaft 16 symmetrically converges rams 17 built into the hoods against the ends of the shape, length centering same over a secondary central reference and anchorage point 3'. Ignition of mixed combustible gases under pressure in the flat nozzles of the upper and lower angularly extending banks of tubes 18 burns scale and foreign matter off the web 19 of the shape as the rotating shaft 16 moves the carrier 20 T-keyed 21 to the table 22 of FIG. 4, longitudinally to and beyond the end of the shape. The flames are automatically reduced. A motor 23 operated blower 24 discharges the waste into a container 25.

With the extremities of the shape cleaned, the shape is lowered to the belts for forwarding to the welding area 26 by the belts, where it is arrested in line with the end welders 27 by similar stop pins 13'.

FIG. 2 shows the operating faces of the combined cleaning and welding elements that are adaptable to shapes of various depths. The required number of flame burning tubes 18 are brought into operating position to fit the width of the troughs of the shape.

With the shape forwarded to and positioned in the welding area 26 low pressure air is introduced into the required number of lower cylinders 28 that fit the depth (trough) of shape whereby the shape is lifted evenly off the conveyor belts 11, by the dual connection angle 29 that is held in plural slotted angle carrier dies 30 in contact with the ends of plural welding electrodes 31 connected to the secondary welding current through guided terminal arms 32 T-keyed 33 to the welder case 34. The upper mating connection angle 35 is brought down and positioned on the upper face of the web 19 by two or more projected upper angle carriers 36. In the preferred method of operation all the upper dies except one near the center of the web are withdrawn, whereby only one completed welding circuit across the three steel elements is left. The closing of the welding current switch 37 with co-ordinated automatic timing, cycling, variable piston pressure, pre-heat and post-heat controls effects a single compound-chain spot weld between the three steel elements. The upper electrode 38 is then withdrawn. Successive similar individual closure and retraction of the applicable plural electrodes completes the fabrication of the member by the execution of consecutive independent spot welds. To afford an unyielding resistance, at the same elevation for the lower connection angle on the tips of the lower electrodes in the successive individual resistance welding of the plural spots a U-shaped supporting tongue 39 is mechanically projected into a slotted 40 base-supported track 41 to support an adjustable conical collar 42 rigidly attached to the lower end of each of the double piston rods 43. On completion of the fabrication, retraction of the lower electrodes lowers the completed beam member 7 to the belts for forwarding to discharge at 44.

FIG. 3 shows a side elevation, partly in section, of the end welder 27 wheel-mounted 45 on the track with welding controls in general 37, pairs of flexible electric cables 46, guided terminals 32 and 32' insulated 47 from the carrier dies 36 and 30 and piston rods 48, electrodes 31 and 38 clamped 49 in the ends of terminal arms, fixed slag deflectors 50 and 51, T-guides 33 and projectible solenoid controlled stop pins 13'. Diverging of the dies returns the shape to the belt for discharge to collecting cradles (not shown) at 44.

One of the six independent secondary welding circuits shown in this view consisting of the lower flexible cable 46, encircling the low voltage side of the transformer in case 34, continues out as upper cable 46 that is connected to guided 33 terminal arm 32'. A short segmental piece of slotted angle carrier 36 is rigidly attached to and insulated from the bottom of the arm 32' and is slidably T-keyed 33 to the front of the case 34, vertically guiding the arm 32'. Various diameters of electrodes can be clamped 49 in the lower front end of arm 32' for contact with and welding of the upper connection angle 35, nested in the slotted carrier 36. The piston rod 48, attached to the upper end of arm 32', with the piston in pressure cylinder 28 controls the vertical positioning of arm 32' for welding or freeing of the work for forward passage. The arm 32 is an inverted duplicate of arm 32', which closes the circuit back to the lower cable 46 only when the mechanism is in the converged welding position.

FIG. 4 shows a side elevation, partly in section, of the flame-cleaning slag-collecting mechanism mounted on a carrier 20 that can be moved by a continuously keyed shaft 16 independently of the common base 6 moving shaft 5 at any location on the track. The carrier is keyed to the shaft 16 through a train of gears and shafts 52. Motorized 53 base mounted conveyor belts 11 are supported by pairs of frames 54 at the sides of the base 6.

There are various circuits, types of current, electric and electronic devices and controls in commercial use that may be applied to this welder in various combinations. They mainly occur previous to the transformer and as they have become a separate field in themselves, recognized as an established art they will not be detailed herein. However, controls for varying the voltage, amperage and cylinder pressure for pre-heat, welding, forging, hold and post-heat and the timing cycle will be provided to suit the total various thicknesses of steel and the welding characteristics of the grades of steel of the various members the mechanism is to weld.

What I claim and desire to protect by Letters Patent of the United States is:

1. A resistance welder for the assembly and fabrication of structural beams by welding connection angles to beam webs comprising, a welding station, an integral powered transversely operable belt conveyor for moving the structural beams into said welding station, welder and conveyor control means, said welding station comprising opposed plural slotted angle carriers each adapted to receive and retain a connection angle and to hold said connection angle against the beam web on each side of said web, opposed pairs of welding electrodes, fluid pressure means connected to said electrodes and a transformer having plural secondary welding circuits individually activated in various numbers and patterns by the consecutive converging of selected mated pairs of said opposed electrodes co-operatively closed on said connection angles by said fluid pressure means.

2. A resistance welding apparatus as in claim 1 further comprising, a dual mobile co-ordinated inwardly-facing opposite-hand welder unit variably spaceable on a common longitudinal fabricating line by powered moving means for the co-ordinated and co-operative measuring, laying-out, assembling and fabricating of beams of any length.

3. A resistance welding apparatus as in claim 1 further comprising, dual facing mobile welder units mounted on a common track and symmetrically locatable from an intermediate anchorage by a powered shaft oppositely threaded through the track-mounted welder bases whereby beams of any length are laid-out assembled and fabricated.

4. A resistance welder unit as in claim 1 further comprising, a powered longitudinally extensible ram for the longitudinal positioning of the shape in the welder.

5. A resistance welder unit as in claim 3 further comprising, dual banks of mobile plural flame-cleaning tubes for the carburization and removal of web scale and foreign matter by high-pressure combustible gases and powered mechanical vacuum means, and moving means for said cleaning tubes.

6. A resistance welding apparatus as in claim 1 further comprising dual facing mobile conveyor-welder units mounted on a common track, on which said units are symmetrically locatable from a common central reference point by a powered shaft oppositely threaded through the bases of said units and dual combined flame-cleaning hood and length-centering ram means for the cleaning and positioning of the beam and a powered continuously keyed shaft for the symmetrical moving of said combined hood-rams for the conveying, length-centering, laying-out, cleaning, assembling and welding of beam members in one continuing operation.

References Cited

UNITED STATES PATENTS

| | | | |
|---|---|---|---|
| 2,213,709 | 9/1940 | Lex | 219—87 |
| 3,331,939 | 7/1967 | McConnell | 219—87 |
| 3,085,148 | 4/1963 | McConnell. | |
| 3,257,540 | 6/1966 | McConnell. | |
| 3,341,683 | 9/1967 | McConnell. | |

RALPH F. STAUBLY, Primary Examiner